United States Patent [19]

Grinberg et al.

[11] 4,032,954

[45] June 28, 1977

[54] SILICON SINGLE CRYSTAL CHARGE STORAGE DIODE

[75] Inventors: Jan Grinberg, Los Angeles; Lewis M. Fraas, Malibu; William P. Bleha, Jr., Pacific Palisades; Paul O. Braatz, Los Angeles, all of Calif.

[73] Assignee: Hughes Aircraft Company, Culver City, Calif.

[22] Filed: June 1, 1976

[21] Appl. No.: 691,652

[52] U.S. Cl. .................................. 357/30; 357/63; 357/90; 350/160 LC
[51] Int. Cl.² ............................................. H01L 27/14
[58] Field of Search ............. 357/63, 64, 30, 31, 357/90; 350/160 LC

[56] References Cited
UNITED STATES PATENTS

| | | | |
|---|---|---|---|
| 3,824,002 | 7/1974 | Beard | 350/160 LC |
| 3,971,931 | 7/1976 | Jehle | 250/213 R |
| 3,975,085 | 8/1976 | Yamada | 350/160 LC |
| 3,976,361 | 8/1976 | Fraap | 350/160 LC |

*Primary Examiner*—Martin H. Edlow
*Attorney, Agent, or Firm*—Donald C. Keaveney; W. H. MacAllister

[57] ABSTRACT

There is disclosed a silver doped silicon single crystal charge storage photodiode substrate suitable for use in an alternating current driven liquid crystal light valve. The gain capability of the charge storage photodiode makes it possible to construct a single crystal substrate ac light valve very similar in structure to that presently being used with a cadmium sulphide photodiode, but having improved operating characteristics and benefitting from a more fully developed manufacturing technology for silicon devices. One specific embodiment of such a single crystal substrate is a silicon substrate doped with a slow recombination center element such as silver.

5 Claims, 4 Drawing Figures

SILICON SINGLE CRYSTAL CHARGE STORAGE DIODE

CROSS-REFERENCE TO RELATED APPLICATIONS

The invention described herein is a species of the generic invention described and claimed in U.S. patent application Ser. No. 625,331, filed on Oct. 22, 1975 by L. M. Fraas and W. P. Bleha, Jr., entitled "Charge Storage Diode With Graded Defect Density Photocapacitive Layer" and assigned to the same assignee as the present invention. That application presently stands allowed and the subject matter thereof is incorporated by reference herein. The subject matter of that application has also been described in two articles published in the February 1976 issue of the "Journal of Applied Physics," Volume 47, No. 2 by L. M. Fraas et al. appearing respectively at pages 576 and 584 and being respectively entitled "Novel Charge Storage Diode Structure for Use With Light Activated Displays" and "AC Photo Response of a Large Area Imaging CdS/CdTe hetero-junction".

FIELD OF THE INVENTION

This invention pertains generally to light image amplifiers or light valves for display devices and in particular to a charge storage diode for such devices which require a semiconductor photosensor the capacitance of which is modulated in accordance with variations of intensity of an input light image.

BACKGROUND OF THE INVENTION

Prior Art

U.S. Pat. No. 3,824,002 in the name of Terry D. Beard, entitled "Alternating Current Liquid Crystal Light Valve" and assigned to the same assignee as the present invention teaches the basic principles of operation of an alternating current liquid crystal light valve which requires that a photoconductor be impedence-matched to the liquid crystal, the photocapacitance of the photoconductor being modulated in response to an input light image.

The above-referenced Fraas patent teaches the advantages of providing such a light valve with a photocapacitive light sensor of high sensitivity comprising a charge storage semiconductor diode disclosed therein as comprising a cadmium sulphide photodiode.

SUMMARY OF THE PRESENT INVENTION

Accordingly, one object of the present invention is to provide such a charge storage photodiode substrate fabricated from silicon and doped with a slow recombination center element such as silver to combine the advantages of a highly developed silicon manufacturing technology with the high liquid crystal stability under ac operating conditions. The advantages of using silicon rather than cadmium sulphide are that larger silicon single crystals are more readily available than is true for cadmium sulphide. Furthermore, the single crystal form, as distinguished from polycrystalline form, implies better and more consistent semiconductor qualities and quality control. Silicon also provides a better quality of latice matching and its characteristics and processing are better understood than are those of cadmium sulphide.

By comparison with silicon dc liquid crystal light valves known in the prior art, the present device affords greater stability of the liquid crystal with ac operation than with dc.

These advantages are achieved by doping a silicon substrate with a slow recombination center element such as silver in a detailed manner described below.

BRIEF DESCRIPTION OF THE DRAWINGS

These and other objects, advantages and features will be more fully understood from the detailed description below taken in conjunction with the accompanying drawings in which like reference characters refer to like parts throughout and wherein.

DETAILED DESCRIPTION OF THE DRAWINGS

Figure 1:
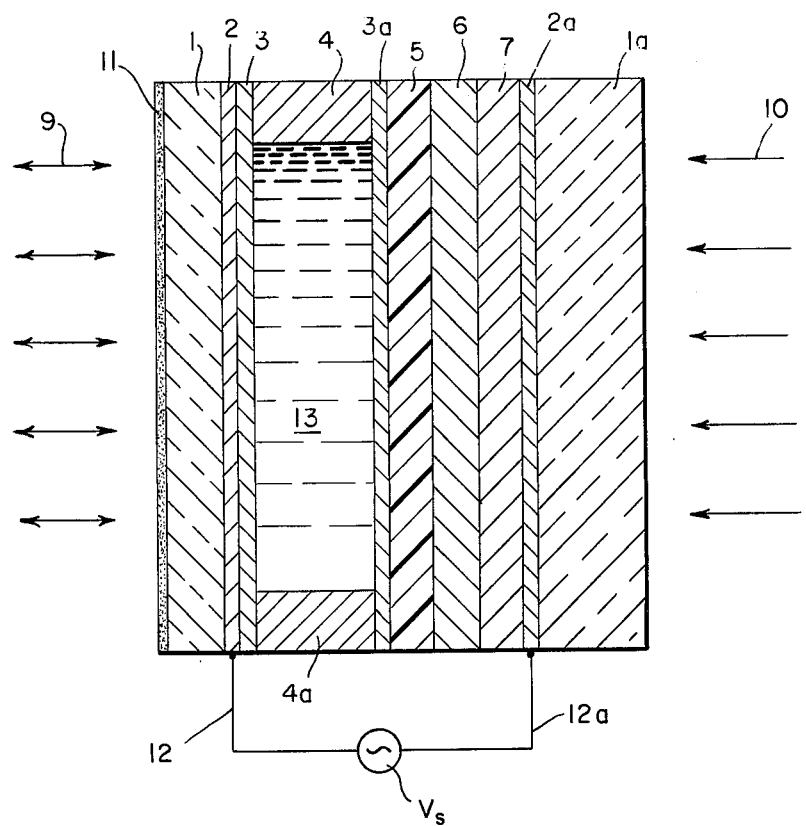
FIG. 1 is a reproduction of FIG. 1 in the above-noted Fraas application which in turn includes a reproduction of FIG. 1 of the Beard U.S. Pat. No. 3,824,002 and shows an alternating current driven light valve.

Turning now to the drawing, there is shown in FIG. 1 a reproduction of FIG. 1 in allowed copending patent application Ser. No. 625,331 filed Oct. 22, 1975 on behalf of Lewis M. Fraas and William P. Bleha, Jr. entitled "Charge Storage Diode With Graded Defect Density Photocapacitor Layer" and assigned to the assignee of this application. As noted above, the subject matter of that application is incorporated by reference herein since the invention herein is a species of the generic claim allowed therein. Reference is also made to two articles published in the February 1976 of the "Journal of Applied Physics" at pages 576 and 584 respectively both authored by L. M. Fraas, J. Grinberg, W. P. Bleha, Jr., and A. D. Jacobson and discussing in greater detail the invention described in the above-noted Fraas application.

To summarize briefly the structure of FIG. 1, there is shown a photo-activated ac liquid crystal light valve which is a planar multilayered structure that can impress an AC voltage (which in operation is effective between inputs 12 and 12a to transparent electrodes 2 and 2a respectively) on a liquid crystal layer 13 in direct relationship, both spatially and temporaly, to the variations of intensity of an incident input light image, 10.

Since this planar device has no structurally defined resolution elements and the component thin film layers have high sheet resistance, high resolution output imagery 9 is possible. For a more detailed description of ac liquid crystal light valves, reference is made to U.S. Pat. No. 3,824,002 issued to Terry D. Beard. The light valve generally is fabricated on a glass substrate 1a or on other optical quality substrate material that is transparent to the incident light 10 over the spectral band where the photoconductor 7 is sensitive. A fiber-optic face plate can also be used for this purpose. On the substrate 1a, a thin transparent conductor 2a, typically of indium tin oxide (ITO) is deposited. The peak resistance of this film is preferably 1 to 10 ohms per square, with a value determined by the requirement that there be no appreciable ac voltage variation across the surface of the film when the device is operated with a particular ac frequency or frequencies being used in a particular embodiment.

The next film is a high impedence photoconductor layer 7 that possesses high sensitivity to a low level input image. In the case of a light valve to be used in the "reflective mode" display, the next layer is an opaque light blocking layer 6 that acts to prevent projection light 9, which forms the output imagery, from reaching photoconductor 7.

The next element of the device is a multilayered dielectric mirror 5 consisting of alternating quarter-wave films of high and low reflective index of refraction. The use of such a dielectric mirror requires the use of alternating currents to operate the device as it will block dc voltages from falling across the liquid crystal.

The final layer of substrate 1a is a passivating dielectric film 3a that is inert to electrochemical or mechanical interaction with the liquid crystal being used. The alternating current liquid crystal light valve of FIG. 1 also requires a counter electrode consisting of a glass plate 1 upon which counter-electrode 2 is deposited with a passivating dielectric film 3 being additionally deposited. Plate 1 is preferably coated as at 11. Located between passivating gilms 3 and 3a is the liquid crystal material 13. The thickness of the liquid crystal is determined by spacers 4 and 4a.

It is well known that the liquid crystal electrochemical stability in such light valve is much higher with an ac power supply than it is with a dc power supply. It is also true that the polycrystalline nature of the cadmium suphide photosubstrate disclosed and claimed in the above-noted Fraas et al. application limits the liquid crystal light valve substrate switching ratio, the input sensitivity, and the overall device response time. It is the teaching of the present invention that a single crystal silver doped silicon photosubstrate operated in the ac driven charge storage diode mode may advantageously be used in such a light valve.

First it will be shown that a standard p-n silicon photodiode substrate has a very limited switching ratio, where the switching ratio, S, is defined as the ratio of the sum of the photocurrent plus the dark current divided by the dark current under ac operating conditions. Then it will be explained why the charge diode in either the cadmium sulphide or silver doped silicon form has an almost frequency independent switching ratio. Finally, the charge storage diode model presented for the cadmium sulphide case will be generalized to the light activated charge storage diode model disclosed herein detailing the essential features of such a device in a specific embodiment of the single crystal silver doped silicon charge storage diode.

Figure 2:
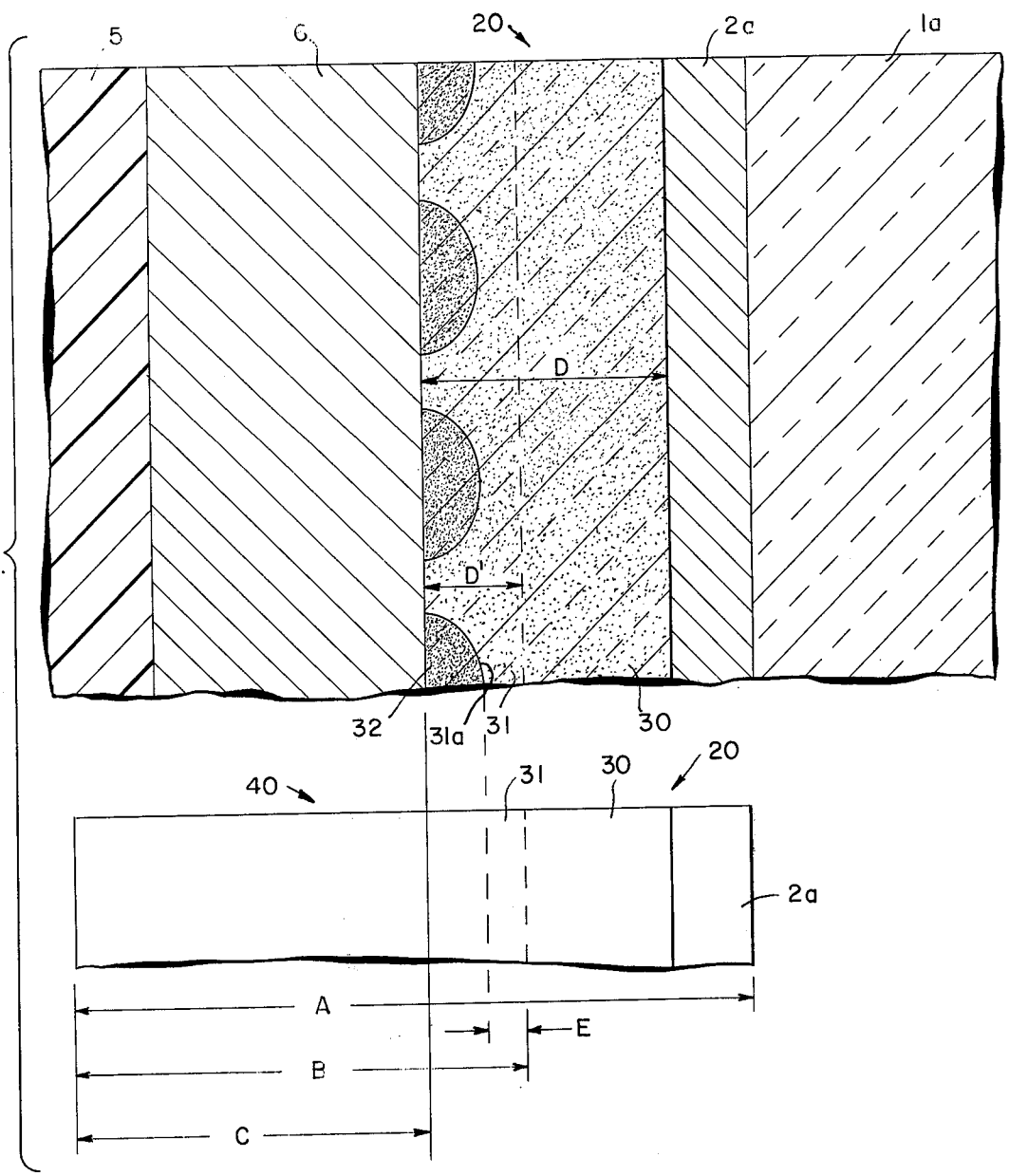
FIG. 2 shows a portion of the light valve of FIG. 1 (on an enlarged scale) modified in accordance with the present invention.

The structural details of the silicon embodiment of photosensor which replaces photosensor 7 in FIG. 1 are shown in FIG. 2. Before considering these details, however, attention is invited to FIG. 3 wherein there is shown a simplified equivalent circuit for the ac liquid crystal light valve of FIG. 1.

Figure 3:
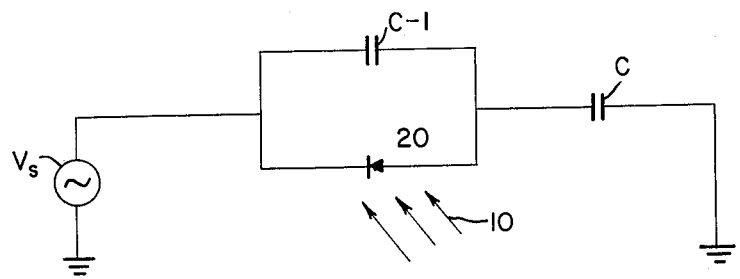
FIG. 3 is a schematic equivalent circuit diagram used in discussing the operation of the device of FIG. 1.

In FIG. 3, the capacitance, C, represents the passive load seen by the photodiode 20 in ac operation. This load physically consists of the dielectric mirror 5 and the liquid crystal layers 13. The capacitance C-1 represents the shunt capacitance of the photodiode 20. This shunt capacitance arises from the finite thickness of the diode layer depletion width. The dark current will be simply:

$$I_{dark} = V\omega C_{dark}$$

where $$C_{dark} = \frac{C_1 \cdot C}{C_1 + C}$$

Assigning typical values for C and $C_1$ as follows:
$C_1 = 1000$ pF/cm$^2$, assuming a silicon depletion width of $10\mu$.
$C = 4000$ pF/cm$^2$ from present light valve values.
Then we calculate
$C_{dark} = 800$ pF/cm$^2$ The light response is that of a photodiode and is given by the responsivity, expressed in amperes per watt of illumination. (I = input illumination).
Thus $$S = 1 + \frac{\gamma I}{I_{dark}}$$

$$S = 1 + \frac{\gamma I}{V\omega C_{dark}}$$

Now, given the typical operating conditions of $V = 50$ volts, $f = 1$ kHz and illumination intensity $= 100 \mu W/cm^2$, and noting that $\gamma = 0.5 A/W$, then we obtain $S = 1.2$.

In summary, the problem with the standard p-n silicon photodiode is that the light-generated current is independent of frequency. Since, in practice, we must choose a frequency of above 1 kHz, this limits the switching ratios obtainable to very low values. The reasons the frequency must be above 1 kHz are as follows.

First, device resolution increases with frequency because of less stringent requirements on sheet resistivity. Second, the period of the operating frequency has to be short as compared to the required illumination rise time and the TV frame.

As noted above, the standard silicon p-n photodiode light response is independent of frequency. So, since the dark current increases with increasing frequency, the switching ratio for a light valve incorporating such a standard photodiode will decrease with increasing frequency to useless values. In contrast, the switching ratio of the CdS charge storage diode disclosed in the above-referenced Fraas application, to a first approximation, is independent of the frequency. This is due to the slow recombination centers present in the sputtered CdS films. The trapped holes act as positive stored charge in the charge storage CdS diode. In the ac coupled substrate shown in FIG. 1 the voltage across the diode varies periodically from a back bias voltage of $2V_0$ peak to 0. When the voltage is high the free electrons are depleted from the film, then as the voltage decreases they flow back in order to neutralize the charge. Therefore, for each cycle, a charge equal to the stored charged flows back and forth. Thus, in the charge device the charge is independent of frequency, in contrast to a standard silicon p-n photodiode where it is the photocurrent that is independent of the frequency. The constant charge per cycle in CdS implies that the photocurrent is proportional to frequency:

$$I = Q/T = Q \cdot f$$

where $I$ is the photocurrent, $T$ is the period associated with the given frequency, and $Q$ is the stored charge.

Therefore, having photo and dark currents proportional to frequency, the CdS charge storage diode provides a switching ratio almost independent of frequency. Hence, we can operate it either as an ac of dc device. This is clearly a major advantage since it permits a very simple coupling of the photocurrent through the dielectric mirror.

Figure 4:
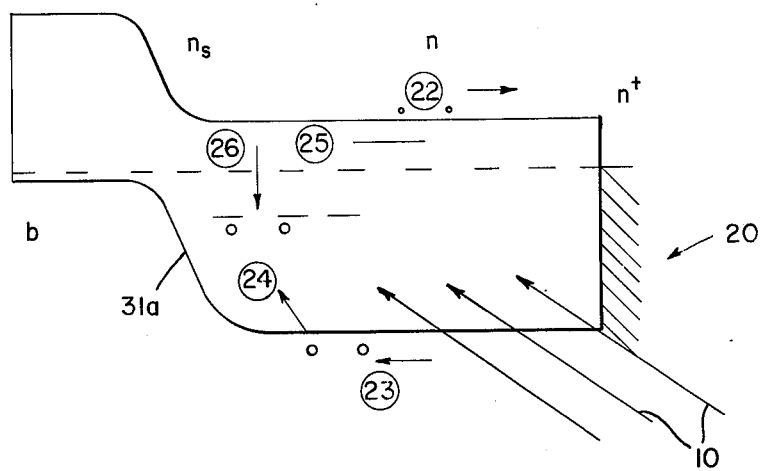
FIG. 4 is an energy band gap diagram used in discussing the characteristics of the modification shown in FIG. 2.

In FIG. 4 there is shown a schematic diagram of the electronic band structure for a charge storage photodiode 20 such as that shown in structural detail in FIG. 2 on which light 10 is incident. The structure consists of an n+ transparent ohmic contact, 2a, a high resistivity easily depleted n region 30, an n region 31 with slow recombination centers $n_S$, and one or more p regions 32. The junction between the regions 32 and the region 31 forms the rectifying heterojunction. The manner of construction of the device will be described below.

Considering the operation of the device as depicted in FIG. 4, it will be noted that in the self-back biased state, the electrons 22 which are generated are swept to the n+ contact, and the holes 23 are swept into the $n_S$ region, 31, and captured by the slow recombination centers 24 forming a stored charge. Once each ac cycle, as the voltage approaches 0, the electrodes flow back into the n region and then into the $n_S$ regions as shown at 25, where they can partially recombine, as at 26, with the stored charge.

The essential difference between the charge storage diode and a standard photodiode is in the fact that holes are captured near the n-p junction interface 31a at slow recombination centers where they are stored. The $n_S$ region, 31, with the slow recombination centers makes the difference. The charge storage diode is an n-$n_S$-p, or an $n_S$-p photodiode, not an n-p photodiode.

FIG. 2 shows a cross-section of a preferred embodiment of the silicon single crystal charge storage diode and a diagrammatic dimensional cross-section illustrating the steps in the method of manufacture thereof.

In this embodiment, a silicon single crystal, 20, serves as the substrate for the charge storage diode. The slow recombination centers are provided by silver doping. A silver impurity level in silicon lies at 0.29 electron volts below the conduction band. This level has a high cross-section for hole capture, $\sigma_p = 10^{-14}$ cm$^2$, and a low cross-section for electron capture, $\sigma_n = 10^{-17}$ cm$^2$. Given these cross-sections and following the reasoning outlined in the published papers for the CdS charge storage diode, it follows that the silver doped silicon light valve has the following performance:

Given a region 31 of $n_S$ type having a thickness equal to 5 microns and a region 30 of n type having a thickness equal to 50 $\mu$m, then the time response of the device for a switching ratio of 3 to 1 is 500 $\mu$sec; the saturated switching ratio is 6 to 1; and the light intensity for a switching ratio of 3 to 1 is 60 $\mu$w per cm$^2$. Finally, the operating ac frequency is 10 kHz and the silver dopant level in the $n_S$ region 31 has a value of $10^{17}$ /cm$^3$. These performance characteristics indicate significant improvement over operation with the CdS light valve previously disclosed.

In fabricating the device shown in FIG. 2, it is preferred to start with a silicon single crystal 40 having a thickness, indicated by the line A in FIG. 2, which may for example be about 5 mils for convenience of handling. This single crystal of silicon is preferably of n type initially having, for example, a phosphorous dopant level of about $10^{13}$ cm$^3$ throughout.

This single crystal n type silicon is next diffused from the left side with silver to a density of $10^{17}$ atoms per cubic centimeter and extending to a depth through the thickness indicated by the line B in FIG. 2 which may, for example, be approximately 3 mils of the total 5 mil thickness. Since it is desired to form the layer 31 to have a maximum thickness D'S of 12 microns and a minimum thickness E adjacent an island 32 of about 5 microns, a portion of the single crystal is next removed by polishing. This portion has a thickness indicated by the line C of 2.5 mils in FIG. 2 and leaves the area 31 of about 12 microns at its thickest portion D'S and about 5 microns minimum thickness E Silver doping of the n type substrate 30 extends throughout region 31. This technique is used in order to permit the initial handling of a single crystal sufficiently thick to be mechanically strong enough to be worked. The n+ layer 2a is also preferably diffused into the other side of the single crystal before the polishing step. This layer may be formed by diffusing in a boron impurity having a concentration of about $10^{18}$ atoms per cubic centimeter over a very thin layer.

After removal by polishing of the 2.5 mil layer indicated by the line C, there is left a substrate having a total thickness, D, of about 2.5 mils of which the region 31 having a thickness D' has a thickness of about ½ mil or 12 microns. This region 31 contains the silver doping and will contain the p island 32. These islands are formed after the polishing operation by diffusion through holes in a mask of a positive impurity dopant such as boron at a concentration of approximately $10^{18}$ per cubic centimeter. The p islands 32 preferably extend to about 7 microns in depth and 10 microns in width or diameter.

The processed silicon single crystal wafer is then affixed to glass substrate 1a by any conventional adhesive so that the n+ region or contact 2a is affixed to and supported on the glass substrate 1a. The light blocking layer 6 in this device is next affixed to the silicon. This light blocking layer 6 preferably comprises a cermat material consisting of alternate metal and dielectric layers. The dielectric layers may, for example, be silicon dioxide having a thickness of approximately 1000 angstrom units. Thin metal islands are then deposited on each successive layer before the next dielectric layer is put in place. The metal may, for example, consist of aluminum deposited as discreet islands to provide a high sheet resistivity which is preferably greater than $10^{11}$ ohms per square. The alternate metal and dielectric layers each have a thickness of about 100 angstrom units. The multiple layers lead to high light blocking and low through-the-film resistivity which is preferably less than $10^4$ ohms per square centimeter.

A dielectric mirror 5 such as described in the earlier Fraas application is then affixed to the light blocking layer 6 and the device is finally assembled to the liquid crystal material into the final cell as disclosed in the previous embodiment.

Finally, it should be noted that whereas we prefer to use silver atoms in the layer 31 to provide the deep slow recombination centers, it is also possible to create these centers by ion implantation of protons of by gamma ray bombardment to generate damage centers also forming deep slow recombination centers.

What is claimed is:
1. A photodiode for an alternating current driven light valve of the type wherein the photocapacitance of a light responsive semiconductor layer of said diode which is supported on a transparent substrate of said valve to receive light transmitted therethrough can be modulated in response to changes in the intensity of such incident light, the improvement in said diode comprising:
- a. first and second semiconductor layers forming the rectifying junction of a charge storage photodiode;
- b. said first layer being a light responsive single crystal silicon photoconductor the photocapacitance of which can be modulated in response to changes in the intensity of said incident light and said second layer being a semiconductor having a polarity opposite to that of said first layer;
- c. said first layer comprising a first region of semiconductor material having a low density of defect centers and a second region of semiconductor material having a higher density of defect centers, said second region being contiguous with said junction and said first region being contiguous with said second region and being exposed to receive said incident light which is effective to generate charge carriers which are stored in said second region and which change the photocapacitive depletion width adjacent said junction to enhance the sensitivity of said diode, the defect centers of said second region of said single crystal silicon first layer forming slow recombination centers.

2. A device as in claim 1 wherein said slow recombination centers are formed by an element diffused into said first layer of silicon.

3. A device as in claim 2 wherein said dopant consists of silver atoms.

4. A device as in claim 1 wherein said slow recombination centers are formed by ion implantation induced damage centers.

5. A device as in claim 1 wherein said slow recombination centers are formed by gamma ray induced damage centers.

* * * * *